United States Patent [19]

Gray

[11] Patent Number: 5,635,915
[45] Date of Patent: Jun. 3, 1997

[54] TRANSMISSION SYSTEM

[75] Inventor: Trevor T. Gray, Victoria, Australia

[73] Assignee: Ilid Pty. Ltd., Australia

[21] Appl. No.: 768,216

[22] PCT Filed: Apr. 17, 1990

[86] PCT No.: PCT/AU90/00150

§ 371 Date: Oct. 11, 1991

§ 102(e) Date: Oct. 11, 1991

[87] PCT Pub. No.: WO90/13067

PCT Pub. Date: Nov. 1, 1990

[30] Foreign Application Priority Data

Apr. 18, 1989 [AU] Australia .................................. PJ3763

[51] Int. Cl.$^6$ .................................................. G08C 19/00
[52] U.S. Cl. ................... 340/825.57; 340/825.35; 235/383
[58] Field of Search ................... 340/825.57, 825.35, 340/331, 715, 525; 235/383, 385; 307/157; 345/112

[56] References Cited

U.S. PATENT DOCUMENTS

| | | | |
|---|---|---|---|
| 4,002,886 | 1/1977 | Sundelin | 340/825.35 |
| 4,500,880 | 2/1985 | Gomersall et al. | 340/825.35 |
| 4,521,677 | 6/1985 | Sarwin | 235/385 |
| 4,766,295 | 8/1988 | Davis et al. | 235/383 |
| 4,937,586 | 6/1990 | Stevens et al. | 340/825.35 |
| 4,992,775 | 2/1991 | Castle et al. | 340/525 |
| 5,019,811 | 5/1991 | Olsson et al. | 340/825.35 |

FOREIGN PATENT DOCUMENTS

| | | | |
|---|---|---|---|
| 60-32443 | 2/1985 | Japan . | |
| 60-32444 | 2/1985 | Japan . | |
| 60-32460 | 2/1985 | Japan . | |
| 60-32460 | 6/1985 | Japan . | |
| 60-32444 | 6/1985 | Japan . | |
| 60-32443 | 6/1985 | Japan . | |
| 1-195597 | 8/1989 | Japan . | |
| 1-195596 | 8/1989 | Japan . | |
| 2212965 | 8/1989 | United Kingdom | 340/825.35 |
| WO8806773 | 9/1988 | WIPO | 340/825.35 |

*Primary Examiner*—Jeffery Hofsass
*Assistant Examiner*—Andrew Hill
*Attorney, Agent, or Firm*—Burns, Doane, Swecker & Mathis

[57] ABSTRACT

A product pricing system for supermarket shelf labels (14) contains an electronic data transmission system which transmits pricing information to electronic shelf labels (14) by modulating a data information signal (33) in the electric supply to artificial lighting (13) in the environment of the labels. The labels have a solar cell (16) for providing operating power and a photo detector (15) for detecting the data information in the artificial light. The data contains address information and data relevant to pricing, storage and sale of items and is displayed by shelf label LCD display (17). The modulation is by way of phase modulation in a central control unit (12). Each module incorporates a re-chargeable battery (18) and an adjustable timer for timing the interval between broadcasts to the particular module whereby the particular module is caused to flash its LCD display in the event that a broadcast is not received within a predetermined time to alert personnel of a possible fault in the module or system.

10 Claims, 4 Drawing Sheets

TRANSMISSION SYSTEM

BACKGROUND OF THE INVENTION

The present invention relates to a data transmission system and more particularly to a data transmission system suitable for use, for example, in transmitting pricing data to electronic shelf labels in retail stores, such as supermarkets, and for displaying the data. Of course it will be appreciated that the invention may be used in any situation wherein data is transmitted to many different locations remote from a central base station and has particular utility where the data is frequently changing. For example the invention could be used in building paging systems or in warehousing, for inventory control.

A number of electrical or electronic systems have been proposed in the past for providing warehouse and supermarket shelf labels. Such systems of course considerably reduce or eliminate the labour costs associated with maintaining and up-dating shelf labels and because of their expediency, reduce financial loss due to price change lags. Thus the known electrical or electronic systems provide considerable advantage but unfortunately they also introduce some technical problems. For example, any system which requires direct wiring is expensive to install and considerably reduces the flexibility of moving and re-arranging shelves which is a common practice in supermarkets.

Another system which has been proposed uses radio broadcasts to send radio frequency (r.f.) signals to up-date information of electronic shelf labels (modules). This sytem overcomes the problem of connecting wires but requires a battery to power each module and an antenna at each module to transmit and receive the r.f. signal. Both these requirements are likely to introduce obstacles which may stand in the way of widespread acceptance of the system in supermarket environments. Firstly the battery will require replacement from time to time which, in a typical store having say 6000 modules, would be a time-consuming and costly exercise. Furthermore, whatever type of miniature antenna is used it is likely that areas of poor transmission/reception will be encountered and this would detract from the overall performance and acceptability of the system. The requirement for the installation of transmitter antenna throughout the store also means that this system does not totally eliminate store wiring. A system using r.f. transmission requires also, approval of the authorities controlling r.f. transmission and this creates a further inconvenience and possible delay at the outset.

Accordingly, it is an object of this invention to provide an improved data transmission system which obviates one ore more of the aforementioned problems of the known systems or such a system which at least provides a useful alternative.

SUMMARY OF THE INVENTION

The invention, therefore provides a data transmission system including a plurality of discrete modules for receiving and displaying information, a control unit remote from said modules for generating data relevant to said information, a modulator connected to said control unit for modulating said data with signals to be transmitted, and electric lighting in the environment of said modules, characterized in that, said modulator is connected in the electric supply to said electric lighting so as to modulate said supply with a data information signal containing address information and data whereby the transmitted light contains said data information signal, and each module incorporates a photo detector whereby data is obtained by said modules from the electric lighting of the environment. Each module can also include a solar cell for providing operating power to the module by means of the electric lighting from the environment.

Another form of the invention provides a method of transmitting data to discrete modules from a remote central control unit, which modules are in an environment illuminated by electric lighting and wherein a modulator is connected to said control unit for modulating a main signal with said data, characterized in that, said main signal is the electric power supply to said lighting and said modules include a photo-detector and said method comprises modulating said power supply with an encoded data signal containing address information, detecting said light by said photo detector of each module and decoding said data signal at each module to determine which module/s accept said data.

BRIEF DESCRIPTION OF THE DRAWINGS

In order that the invention may be more readily understood a particular embodiment will now be described with reference to the accompanying drawings wherein.

DESCRIPTION OF A PREFERRED EMBODIMENT

Figure 1:
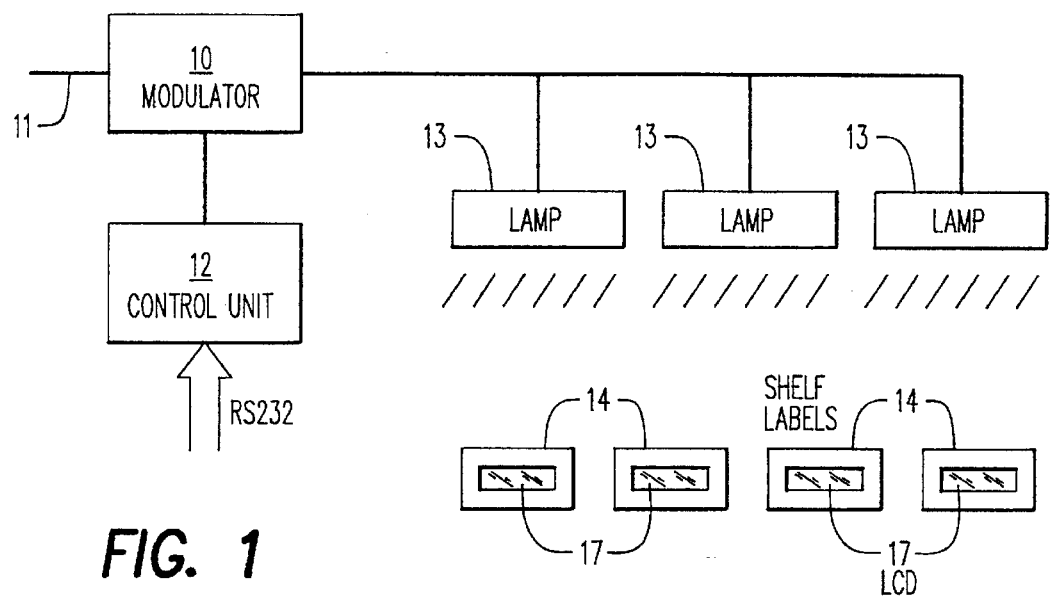
FIG. 1 is a basic circuit block diagram of an electronic supermarket shelf label pricing system according to the invention.

Referring now to the drawings and in particular FIG. 1, there is shown a modulator 10 which receives power on connection 11 from the mains supply. A control unit 12, which consists of a microprocessor and associated logic converts data from a host such as a modem, instore computer or point of sale controller into a format suitable to drive the modulator 10. This data would normally be received by the RS232 port of control unit 12. The output of modulator 10 is connected to artificial lighting in a building which, in this case is fluorescent lamps 13.

When the fluorescent lamps 13 are activated by the modulated supply light emitted therefrom is incident upon shelf label devices 14 of which only 4 are shown in FIG. 1. The control unit 12 receives information relevant to the price of various goods of the store and this information is provided to the modulator 10 which provides a modulated signal incorporating such pricing information. Thus the light emitted from the fluorescent lamps 13 is modulated with a signal containing various information including the address of the shelf label or labels to which the particular price applies and information as to the price. In a cycle of operation all shelf labels in a store are addressed and current or up-dated information relevant to the article price is transmitted. Clearly there may be several labels which apply to the same item. In this instance a table which would be maintained either within the host computer or control unit 12 would indicate which labels (by label address) have been allocated to a particular item.

Figure 2:
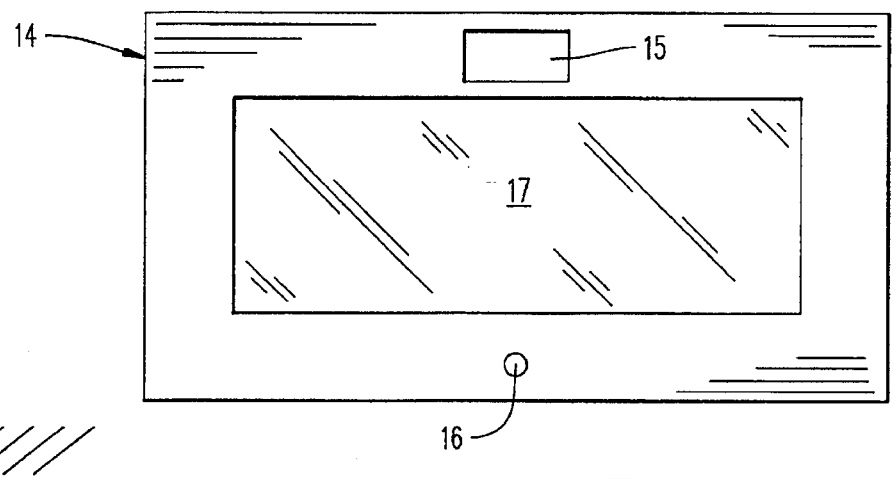
FIG. 2 is a schematic front elevation of a shelf label device according to the invention.

Referring now to FIG. 2, a shelf label device 14 is shown in more detail. It can be seen that a shelf label device includes a photo transistor 15, a solar cell 16 and a liquid crystal display 17. Light from the fluorescent lamps 13 is incident upon the photo transistor 15.

Figure 3:
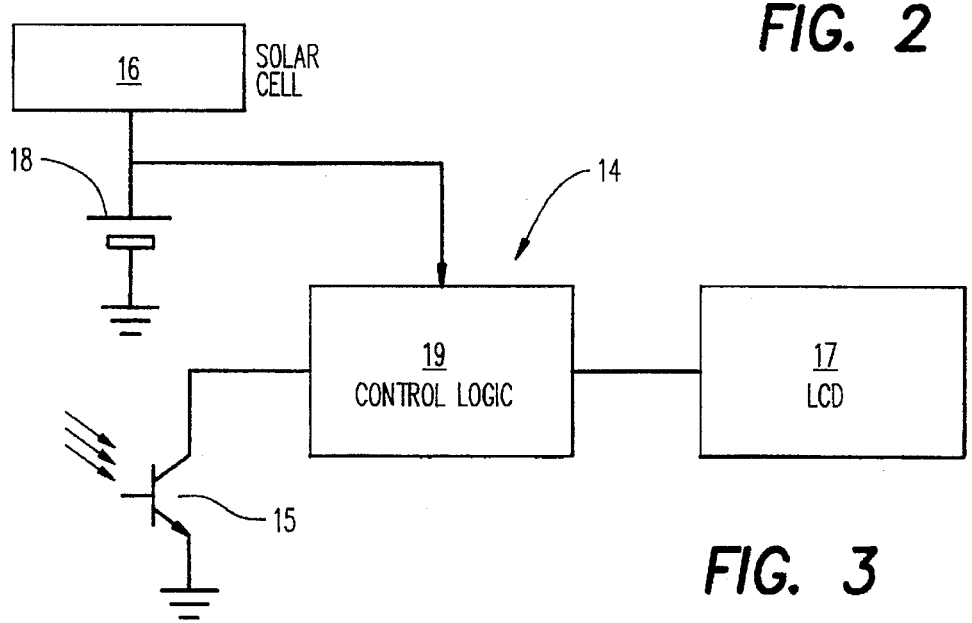
FIG. 3 is a circuit block diagram of the shelf label device of FIG. 2.

Referring now to FIG. 3, a circuit block diagram of the shelf label device 14 is shown. The solar cell 16 is connected to a backup battery 18 and to a control logic circuit 19. The photo transistor 15 is connected to control logic circuit 19 and the output of the control logic circuit is connected to the LCD display 17. It will be noted that light from the fluorescent lamps is also incident upon the solar cell 16 to provide operating power to the shelf label device.

It will be evident from the description hereinabove that the power going to the building's lighting system is modulated with low frequency data information. This causes the lighting to transmit information to the photo detectors of the shelf label devices. This information is then decoded and used to drive the LCD display 17 of each shelf label device 14.

Figure 4:
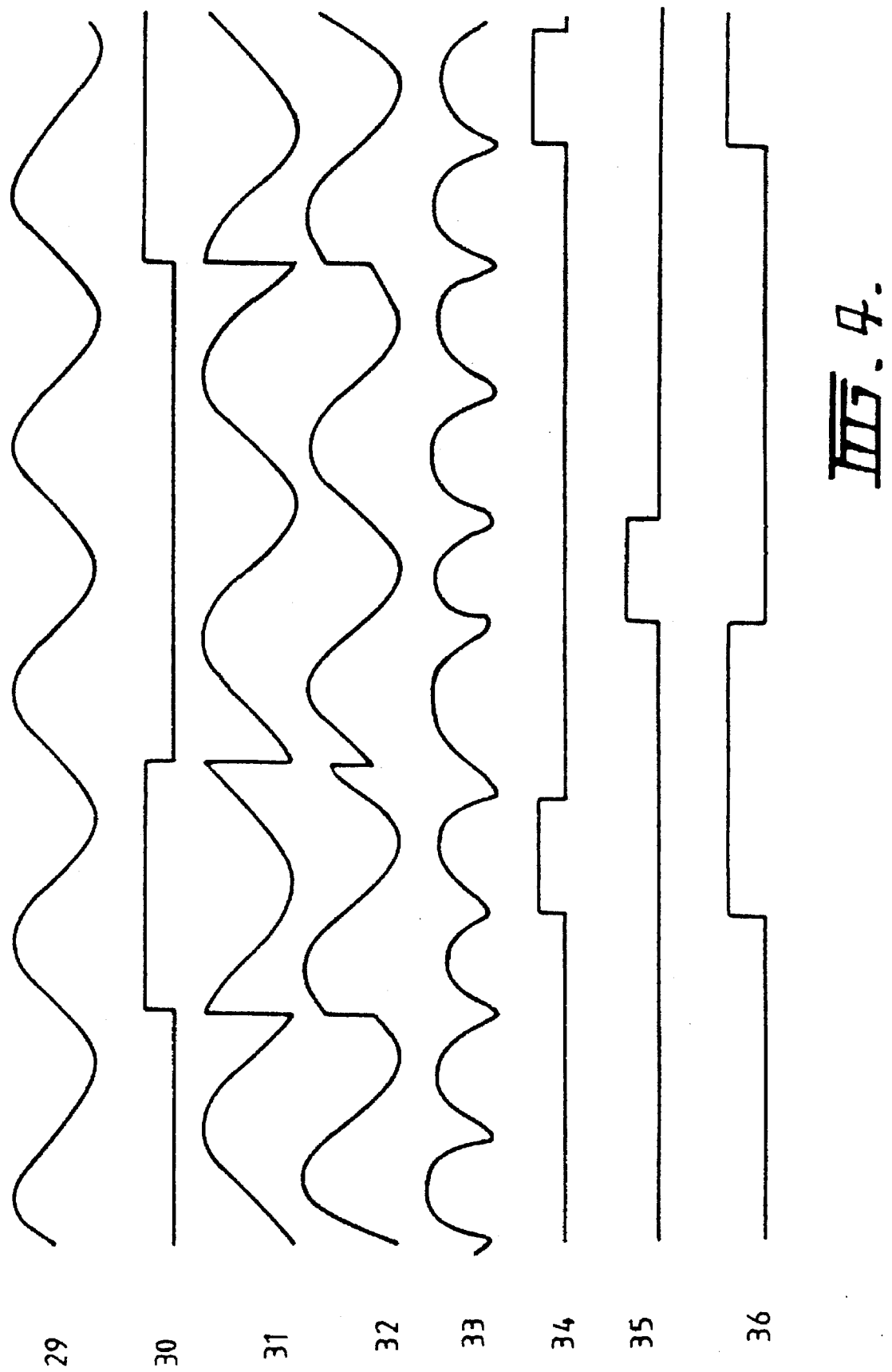
FIG. 4 shows various graphs of the modulation waveform.

FIG. 4 shows graphs of various waveforms as they would be observed around the modulator 10 and within the shelf label 14. Waveform 29 is the 240 volt input power 11 to the modulator 10. Waveform 30 is the data for the shelf labels 14 which has been synchronized with the incoming mains power 29. Waveform 31 which has had the modulation of waveform 30 applied in the form of a phase shift is now added to mains power 29 to produce waveform 32 which is fed to the lighting 13. Waveform 33 is the signal detected by the photo detector 15 and used to produce waveform 34 which is a signal in recognition of a short cycle caused by a phase shift. Conversely waveform 35 is a signal in recognition of a long cycle caused by a phase shift. Waveform 36 is the decoded data produced by a set/reset flip flop the inputs of which are 35 and 34, respectively. This decoded data is fed to an Application Specific Integrated Circuit 20, (ASIC) (see FIG. 5).

Figure 5:
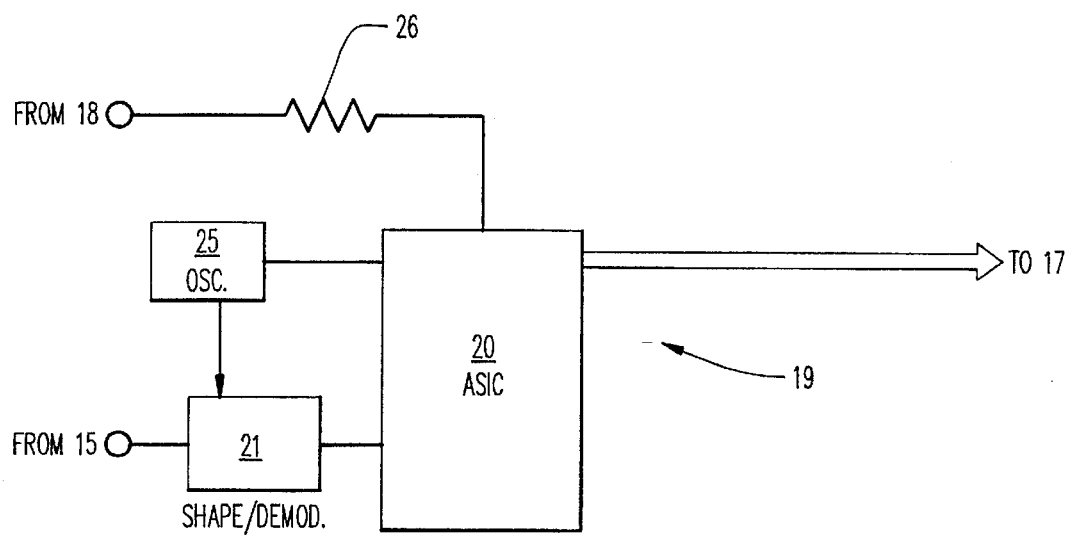
FIG. 5 is a circuit block diagram of the control logic within each shelf label.

FIG. 5 shows derails of The control unit 19 within a label device 14. The unit 19 consists of the ASIC 20 with an oscillator 25 to control its speed of operation. The signal 33 from the photodector 15 is passed through shaping/demodulation circuitry 21 to remove glitches and demodulate a digital input into the serial input of the ASIC 20.

The ASIC uses registers (not shown) to hold the various information that the label must hold. It also contains LCD display drivers (not shown) which are used to drive the LCD directly (not in a multiplexed format) so as to achieve maximum contrast. The power for the control circuitry is derived by feeding the voltage from a rechargable battery 18 through a current limiting resistor 26.

Figure 6:
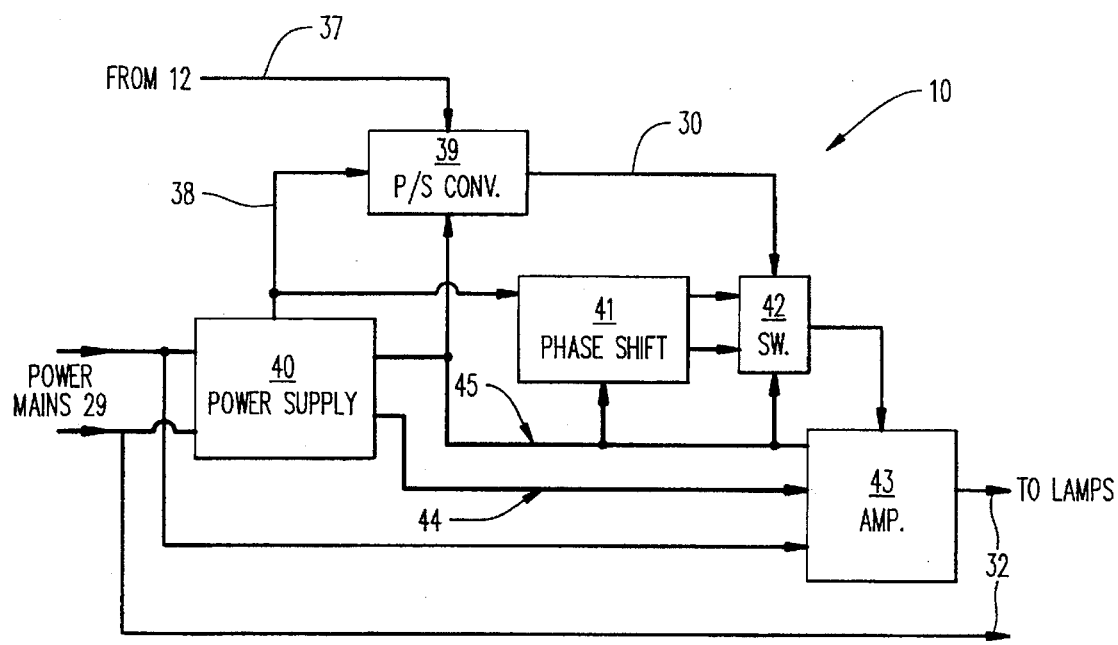
FIG. 6 is a circuit block diagram showing in more detail the power modulator 10 used in the system of FIG. 1.

FIG. 6 provides a more detailed circuit diagram of the modulator 10. The various waveforms shown in FIG. 4 appear on connections in FIG. 6 which are labelled with the corresponding reference. The modulator uses the phase shift voltage 31 to produce small amounts of change in the cycle length of the mains power being applied to the lighting 13. In this way the data transmission is barely visible to the human eye. The modulator 10 has its own internal power supplies (not shown) to produce the +5 volts required by the digital circuitry and ±15 volts required by analog circuitry (bus 45). As well the power supply produces a ±140 volt bus 44 to supply power to power amplifier 43. The mains power pulses on connection 38 (normally 50 or 60 Hertz) are used to synchronize the phase shift changes of 90 degrees produced by phase shifter 41 with the incoming data 30 to drive an electronic switch 42 which in turn drives switch mode power amplifier 43. The power amplifier adds this modulation to the mains producing waveform 32 suitable for driving the lighting 13.

Figure 8:
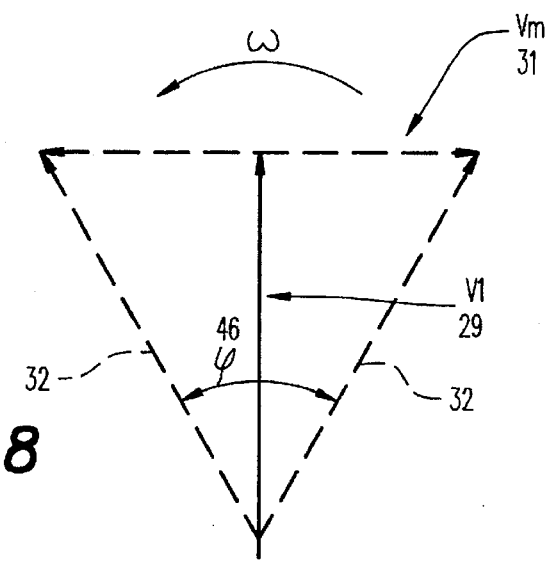
FIG. 8 is a vector diagram showing the phase modulation of the power source.

The actual degree of modulation is represented in FIG. 8 where the mains voltage 29 has a modulation voltage 31 applied in a positive and negative direction. Thus the peak to peak phase modulation (46) would be as follows:

=2 arctan (Vm/V1)

If the mains voltage is 240 volts (V1=240) when a phase shift voltage of 60 volts (Vm=60) is applied then the peak to peak phase modulation would be:

=2 arctan (60/240)

=28 degrees.

Figure 7:
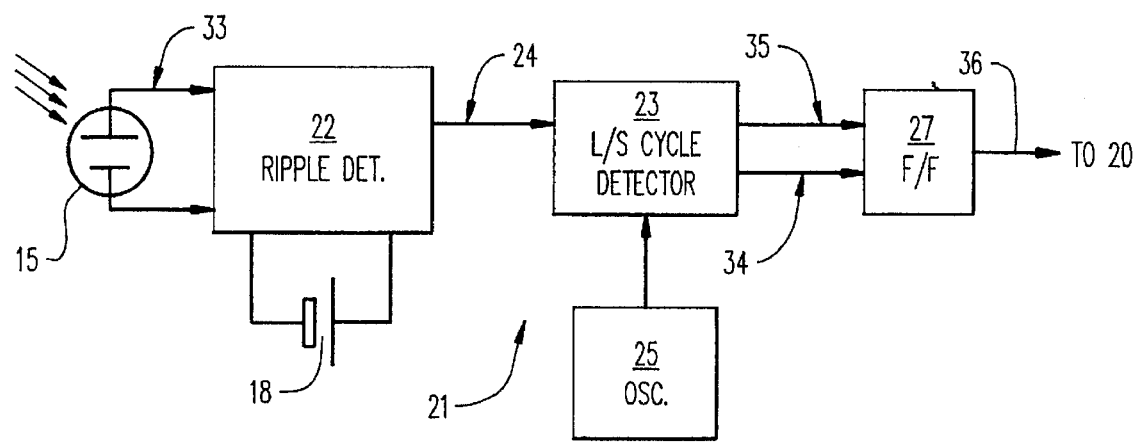
FIG. 7 is a circuit block diagram showing in more detail the signal shaping/demodulator circuit 21 shown in FIG. 5.

Referring to FIG. 7 the shaping/demodulation circuitry 21 of the label 14 detects this phase shift by having a ripple detector circuit 22 which basically consists of a digital counter. This counter counts a number of counts for each half cycle of the mains and by using a long/short cycle detector 23 produces a "long cycle" pulse for every long cycle and a "short cycle" pulse for every short cycle. These pulses are used to drive the set and reset inputs of RS flip flop 27 to decode the transmitted data.

The data is broadcast to all lighting in the area as each label has its own identity code to allow it to detect which data is valid for its own particular purpose. As all the labels 14 are delivered without a predetermined address the labels are normally installed to the shelf stripping and then have a specific address downloaded into them by a portable handheld computer which has a special adaptor which allows the handheld computer to modulate a specific label's photo detector without affecting any other label. Once a label has received its address it is possible to set a flag within the label so that it will not accept data or instructions from the handheld computer until this flag is reset through the lighting system.

As the data flowing to the labels is simplex in that they cannot verify to the host that they received their particular data correctly it is necessary to use a special form of communications. Most of the RF labels use an ACK/NAK system but this is not possible when light is used as the transmission medium. In this system it is possible to set a timer within the label so that a particular label will expect to see its address broadcast within this time. If this does not occur the label would alert the store management by flashing it's display.

The labels also contain a communication flag which allows the labels to be communicated within various non exclusive sets of which the total store would be the universal set. For example all the "special prices" for a forthcoming promotion could be loaded into labels preceding the promotion and on the first morning of the promotion all the labels associated with the promotion could be instructed to display the "specials price" using just one command. Other examples of specific sets would include, by Manufacturer, Aisle and product type. Of course it is possible for retailers to establish their own particular sets.

As well as deriving data from the building's lighting system, the shelf label devices obtain operating power by means of the solar cell which is similar to that used in modern electronic watches and calculators. FIG. 2 shows how the solar cell 16 is incorporated as part of the surround for the shelf label device. Each shelf label device 14 has means in the form of battery 18 for storing electrical energy so that in the absence of sufficient light to provide energy to the device data would be retained for a minimum of 48 hours. Thus, each shelf label device is completely sealed at the time of manufacture and requires no service during its life.

As is evident the preferred embodiment encodes the power supply using a low frequency data signal. This is necessary because the lighting is by way of fluorescent lamps and the ballasts in the lamps filter any high frequency signals. Thus, as shown in FIG. 4, the frequency of the data signal 30 is on the same order of magnitude as the power waveform 29, which is typically less than 100 Hz. However, with the advent of solid state ballasts it is clear that the power supply could be encoded with high or at least higher frequency data signals.

It should be evident that the electronic display system described herein has application in retailing, warehousing, inventory control or in fact any situation requiring variable information to be transmitted and/or displayed. The data transmission system could be used in a building paging system. In the case of an electronic shelf label system the invention provides the advantage of requiring no interconnecting wires as power and information is transmitted via the building lighting system. This allows the label to be easily moved and prevents loss of information due to damaged interconnecting wires. For retail operations which use scanning point of sale systems, the electronic labels can be interconnected to the scanning equipment so that shelf prices and checkout prices always exactly agree. In addition the label can assist in store management by displaying other relevant information after hours such as:

1. Computer record of stock.
2. Re-order quantities.
3. Number of cartons to be loaded on to the shelf per product line.
4. Location of stock in the rear warehouse.
5. Buy-price.
6. Shelf facings required per item.
7. Price per unit measure.
8. Promotional price.
9. Communications or set flag.
10. Label address,
11. User definable field.

Figure 9:
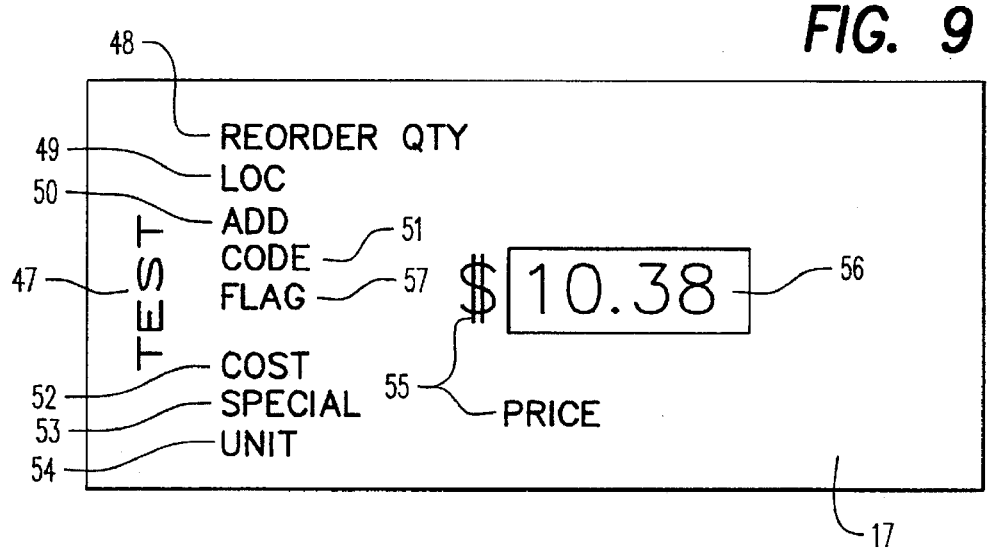
FIG. 9 is a pictorial representation (not to scale) of a LCD display of a shelf label of the system showing the information it would display.

FIG. 9 shows how the LCD display 17 of a typical label 14 might look in English. Field 56 would be the actual numerical contents of a particular piece of information, for example price. Field 55 indicates that field 56 relates to price or currency. Field 54 indicates price per unit measure and can actually be selected manually by covering the photo detector with a finger. Field 53 indicates that the item the label relates to is on promotion. Field 52 indicates cost price. Field 47 is used when the label is put into "TEST" mode such that all fields of the LCD are displayed. A retailer can do this to all labels within a store to allow the retailer to move around the store and ensure all labels are correctly communicating and do not have faulty segments in their displays.

Field 57 displays the value of the communication flag while field 51 is a user definable field. Field 50 displays the address of the label and field 49 displays location of the stock in the storeroom. Field 48 can be used for stock reorder quantity or recommended stock holding levels.

In a warehousing or wholesale operation, the labels can be used to direct storemen as to the quantities of stock required, order to which stock relates and assist with stock-taking procedures. In an inventory or production environment the labels can be attached to jobs in progress to indicate current status or production control information. In this type of environment the labels could act as very low cost mobile pagers displaying simple information to people within the building. It is even possible for people to carry labels on themselves.

In addition by allowing the display of the label to display bar codes, information could be passed electronically to remote data terminals or control, for example picking, equipment. Unlike other electronic labels available, the labels of the present invention do not use radio frequencies to obtain their data so they do not require an approval for radio transmission.

We claim:

1. A simplex information transmission and display system, comprising:

a control unit for generating data relevant to said information;

an electric lighting system that is in the environment where said information is to be displayed and that has an a.c. power supply;

a modulator connected to the power supply for said electric lighting system and to said control unit, to phase modulate the power supplied to said electric lighting system with a signal having a frequency on the same order of magnitude as said power supply and containing address information and said data, to thereby transmit data and address information via light emitted from said lighting system; and a plurality of discrete modules located remote from said control unit and in the environment of said lighting system, each having a self-contained power source for supplying operating power thereto, a photodetector for detecting the data and address information transmitted via said light, and an LCD display for displaying the detected data.

2. The information transmission and display system of claim 1, wherein said self-contained power source includes a battery.

3. The information transmission and display system of claim 1, wherein said self-contained power source includes a solar cell for providing power to the module from the lighting received from said electric light lighting system.

4. A data transmission and display system as defined in claim 1, wherein said system is a product price labelling system and said modules comprise shelf labels.

5. A data transmission and display system as defined in claim 4, wherein each module contains an integrated circuit for holding information related to detected data, and LCD display drivers for directly driving the LCD display of the module.

6. A data transmission and display system as defined in claim 5, wherein said information comprises item price information and other information relevant to the storage and sale of an item.

7. A simplex information transmission and display system, comprising:

a control unit for generating data relevant to said information;

an electric lighting system that is in the environment where said information is to be displayed and that has an a.c. power supply;

a modulator connected to the power supply for said electric lighting system and to said control unit, to phase modulate the power supplied to said electric lighting system with a signal having a frequency on the same order of magnitude as said power supply and containing address information and said data, to thereby transmit data and address information at regular intervals to each module via light emitted from said lighting system; and a plurality of discrete modules located remote from said control unit and in the environment of said lighting system, each having a self-contained power source for supplying operating power thereto, a photodetector for detecting the data and address information transmitted via said light, an LCD display for displaying the detected data, and a timer for timing the interval between receipt of successive transmissions of a particular address, said timer being adjustable to a predetermined time setting and in the event that said address is not received within said predetermined time said module being adapted to visually signal a possible error in the module by flashing its LCD display.

8. A method of transmitting data to discrete modules from a remote central control unit, which modules are in an environment illuminated by electric lighting and wherein a modulator is connected to said control unit for modulating a main signal with said data, wherein said main signal is the electric power supply to said lighting and said modules include a battery to provide operating power to the module and a photo-detector, said method comprising the steps of modulating said power supply with an encoded data signal containing address information of specific modules and having a frequency on the order of magnitude of said electric power supply, detecting light from said electric lighting by said photo detector of each module and decoding said data signal at each module to determine by means of said address information which modules accept said data.

9. A method as defined in claim 8, wherein said modulation of said power supply with an encoded data signal is achieved using phase modulation.

10. A method as defined in claim 9, including the steps of transmitting said address information at regular intervals to each module, timing the duration between receipt of successive transmissions of said address information at each module and causing a display of the module to operate in a flashing mode in the event that the address data of a module is not received within a predetermined time delay, to indicate a communications or module fault.

\* \* \* \* \*